US012133288B2

(12) United States Patent
Huang

(10) Patent No.: US 12,133,288 B2
(45) Date of Patent: Oct. 29, 2024

(54) METHOD FOR PROCESSING CHANGE IN RADIO CAPABILITY OF TERMINAL APPARATUS AND APPARATUS

(71) Applicant: HUAWEI TECHNOLOGIES CO., LTD., Guangdong (CN)

(72) Inventor: Zhenglei Huang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 681 days.

(21) Appl. No.: 17/225,687

(22) Filed: Apr. 8, 2021

(65) Prior Publication Data
US 2021/0227379 A1 Jul. 22, 2021

Related U.S. Application Data

(63) Continuation of application No. PCT/CN2019/108972, filed on Sep. 29, 2019.

(30) Foreign Application Priority Data

Oct. 8, 2018 (CN) .......................... 201811169763.3

(51) Int. Cl.
H04W 8/24 (2009.01)
H04W 60/04 (2009.01)
(Continued)

(52) U.S. Cl.
CPC ............. H04W 8/24 (2013.01); H04W 60/04 (2013.01); H04W 76/27 (2018.02); H04W 84/042 (2013.01)

(58) Field of Classification Search
CPC ....... H04W 8/24; H04W 60/04; H04W 76/27; H04W 84/042
See application file for complete search history.

(56) References Cited

U.S. PATENT DOCUMENTS

2010/0034094 A1* 2/2010 Tenny ..................... H04W 8/22
455/67.7
2015/0208456 A1* 7/2015 Guo ....................... H04W 76/14
455/552.1
(Continued)

FOREIGN PATENT DOCUMENTS

CN 101686510 A 3/2010
CN 101730058 A 6/2010
(Continued)

OTHER PUBLICATIONS

3GPP TR 23.743 v0.2.0 (Aug. 2018), 3rd Generation Partnership Project; Technical Specification Group Services and System Aspects; Study on optimizations of UE Radio capability signaling (Release 16) (Year: 2018).*
(Continued)

Primary Examiner — Huy D Vu
Assistant Examiner — Robert Ma
(74) Attorney, Agent, or Firm — Fish & Richardson P.C.

(57) ABSTRACT

A method for processing a change in a radio capability of a terminal apparatus is provided. The method comprises that an access network apparatus receives radio capability change indication information. The radio capability change indication information indicates that a radio capability of a terminal apparatus changes. The access network apparatus obtains a changed part of the radio capability of the terminal apparatus. The access network apparatus generates updated radio capability information of the terminal apparatus based on at least an old radio capability of the terminal apparatus and the changed part of the radio capability of the terminal apparatus. The access network apparatus sends the updated radio capability information to a core network apparatus.

20 Claims, 9 Drawing Sheets

(51) Int. Cl.
*H04W 76/27* (2018.01)
*H04W 84/04* (2009.01)

(56) References Cited

U.S. PATENT DOCUMENTS

2017/0238188 A1  8/2017  Youtz et al.
2021/0029618 A1* 1/2021  Jain ..................... H04W 48/02

FOREIGN PATENT DOCUMENTS

| CN | 101889458 A | 11/2010 |
|---|---|---|
| CN | 108476421 A | 8/2018 |
| CN | 108541069 A | 9/2018 |
| WO | 2009072956 A1 | 6/2009 |
| WO | 2018174995 A1 | 9/2018 |

OTHER PUBLICATIONS

Vivo, "Solution for how to define the UE capability ID", S2-187933, SA WG2 Meeting #128-bis, Aug. 24, 2018 (Year: 2018).*
3GPP TR 23.743 V0.2.0 (Aug. 2018) 3rd Generation Partnership Project; Technical Specification Group Services and System Aspects;Study on optimisations of UE radio capability signalling(Release 16), 31 pages.
Extended European Search Report issued in European Application No. 19871452.9 on Nov. 9, 2021, 15 pages.
Vivo, "Solution for how to define the UE capability ID," SA WG2 Meeting #128-bis, S2-187933, Sophia Antipolis, France, Aug. 20-24, 2018, 2 pages.
Huawei, HiSilicon, "Solution for UE radio capabilities changed," 3GPP TSG-SA WG2 Meeting #129, S2-1810723, Dongguan, P.R. China, Oct. 15-19, 2018, 3 pages.
3GPP TS 23.501 V15.3.0 (Sep. 2018), "3rd Generation Partnership Project; Technical Specification Group Services and System Aspects; System Architecture for the 5G System; Stage 2 (Release 15)," Sep. 2018, 226 pages.
Vivo, "UE radio access capabilities change," 3GPP TSG-RAN WG2 Meeting #103, R2-1811767, Gothenburg, Sweden, Aug. 20-24, 2018, 3 pages.
3GPP TS 29.212 V15.8.0 (Sep. 2019), "3rd Generation Partnership Project; Technical Specification Group Core Network and Terminals; Policy and Charging Control (PCC); Reference points(Release 15)," Sep. 2019, 285 pages.
3GPP TS 38.331 V15.3.0 (Sep. 2018), "3rd Generation Partnership Project; Technical Specification Group Radio Access Network; NR; Radio Resource Control (RRC) protocol specification(Release 15)," Sep. 2018, 445 pages.
Office Action issued in Chinese Application No. 201811169763.3 on Feb. 9, 2021, 28 pages (with English translation).
PCT International Search Report and Written Opinion issued in International Application No. PCT/CN2019/108972 on Dec. 27, 2019, 16 pages (with English translation).

* cited by examiner

METHOD FOR PROCESSING CHANGE IN RADIO CAPABILITY OF TERMINAL APPARATUS AND APPARATUS

CROSS-REFERENCE TO RELATED APPLICATIONS

This application is a continuation of International Application No. PCT/CN2019/108972, filed on Sep. 29, 2019, which claims priority to Chinese Patent Application No. 201811169763.3, filed on Oct. 8, 2018. The disclosures of the aforementioned applications are hereby incorporated by reference in their entireties.

TECHNICAL FIELD

This application relates to the field of communications technologies, and more specifically, to a method for processing a change in a radio capability of a terminal apparatus and an apparatus.

BACKGROUND

Radio capability information of user equipment (UE) includes information about a radio access technology supported by the UE, for example, information such as a frequency band supported by the UE, a transmission power class, and a transmit and receive capability. The radio capability information of the UE is used by a radio access network (RAN) to manage the UE. To avoid a waste of air interface resources caused when a RAN node queries the radio capability information of the UE through an air interface each time a terminal apparatus accesses a wireless network, a mobility management entity (MME) stores the UE capability information when the UE is in an idle state, and transfers a latest radio capability of the UE to the RAN by using an initial context setup request message in an S1 interface. In this way, the message does not need to be transferred through the air interface each time. If the MME does not send the radio capability information of the UE to the RAN, the RAN obtains the radio capability information of the UE from the UE through the air interface, and reports the radio capability information of the UE to the MME. In a 5G system, because the UE supports information about more frequency bands, a radio capability of the UE in the 5G system is far greater than a radio capability of the UE in an EPS system, and may reach 8K bytes. To reduce signaling overheads and storage overheads that are used to transfer the radio capability information of the UE, a current optimization manner is to use a UE radio capability identifier to represent the radio capability information of the UE. In this way, only the UE radio capability ID needs to be transferred between the UE and the network, and the complete radio capability information of the UE does not need to be transferred each time.

In the current technology, each time when the radio capability of the UE changes, the UE needs to report the complete radio capability information through the air interface, even if only a small part of the radio capability information changes. Consequently, according to a method for processing a change in the radio capability information of the UE in the current technology, air interface radio resources are wasted, especially in a scenario in which only a small part of the radio capability information changes.

SUMMARY

This application provides a method for processing a change in a radio capability of a terminal apparatus and an apparatus, so that when a radio capability of UE changes, only a changed part of the radio capability of the UE is transmitted between the UE and a RAN, and then the RAN generates updated radio capability information of the UE based on old radio capability information of the UE and the changed part. In this way, air interface transmission resources are reduced.

According to a first aspect, a method for processing a change in a radio capability of a terminal apparatus is provided. The method includes:

A terminal apparatus sends first indication information to an access network apparatus or a core network apparatus. The first indication information is used to indicate that a radio capability of the terminal apparatus changes.

The terminal apparatus receives radio capability request information sent by the access network apparatus. The radio capability request information is used to request, from the terminal apparatus, a changed part of the radio capability of the terminal apparatus.

The terminal apparatus sends radio capability change information to the access network apparatus. The radio capability change information includes the changed part of the radio capability of the terminal apparatus.

In this embodiment of this application, when the radio capability of the UE changes, the UE needs to send only the changed part to the access network apparatus, thereby improving efficiency and reducing air interface resources.

With reference to the first aspect, in some implementations of the first aspect, that the access network apparatus receives indication information includes:

The terminal apparatus receives new radio capability identifier information sent by the core network apparatus. The new radio capability identifier information is used to indicate a new radio capability identifier of the terminal apparatus. The new radio capability identifier corresponds to updated radio capability information of the terminal apparatus. The updated radio capability information is determined by the access network apparatus based on at least the changed part of the radio capability.

With reference to the first aspect, in some implementations of the first aspect, that the access network apparatus receives indication information includes: The first indication information includes first radio capability identifier information of the terminal apparatus. The first radio capability identifier information is used to indicate a radio capability identifier corresponding to the changed part of the radio capability.

With reference to the first aspect, in some implementations of the first aspect, the changed part of the radio capability of the terminal apparatus includes disabling indication information. The disabling indication information is used to indicate a disabled radio capability of the terminal apparatus.

When there is a change between a state in which the radio capability is disabled and a state in which the radio capability is not disabled, the disabling indication information is sent, so that signaling overheads can further be reduced, and transmission resources can be reduced.

With reference to the first aspect, in some implementations of the first aspect, that the access network apparatus receives indication information includes: Before sending the first indication information to the access network apparatus or the core network apparatus, the terminal apparatus receives radio identifier capability indication information sent by the access network apparatus. The radio identifier capability indication information is used to indicate that the access network apparatus supports a radio capability identifier.

Whether a network supports a radio capability identifier may be determined based on the radio identifier capability indication information, thereby improving efficiency, and avoiding a subsequent unnecessary procedure.

According to a second aspect, a method for processing a change in a radio capability of a terminal apparatus is provided. The method includes:

An access network apparatus receives radio capability change indication information. The radio capability change indication information is used to indicate that a radio capability of a terminal apparatus changes.

The access network apparatus obtains a changed part of the radio capability of the terminal apparatus.

The access network apparatus generates updated radio capability information of the terminal apparatus based on at least an old radio capability of the terminal apparatus and the changed part of the radio capability of the terminal apparatus.

The access network apparatus sends the updated radio capability information to a core network apparatus.

In this embodiment of this application, when the radio capability of the UE changes, the access network apparatus needs to obtain only the changed part, thereby improving efficiency and reducing air interface resources.

With reference to the second aspect, in some implementations of the second aspect, the access network apparatus sends RAT indication information to the core network apparatus. The RAT indication information is used to indicate an RAE. A radio capability corresponding to the RAT is updated.

When the RAT is indicated, only an identifier corresponding to the RAT needs to be subsequently allocated. If the RAT is not indicated, a new radio capability identifier is allocated. The RAT, where the radio capability corresponding to the RAT is updated, is indicated, so that radio capability identifier allocation efficiency can further be improved.

With reference to the second aspect, in some implementations of the second aspect, the method further includes:

The access network apparatus sends radio identifier capability indication information to the terminal apparatus. The radio identifier capability indication information is used to indicate that the access network apparatus supports a radio capability identifier.

The terminal apparatus may learn, based on the radio identifier capability indication information, whether an access network or another network side apparatus supports a radio capability identifier, thereby improving efficiency, and avoiding a subsequent unnecessary procedure.

With reference to the second aspect, in some implementations of the second aspect, the method further includes:

The access network apparatus sends second indication information to the AMF. The second indication information is used to indicate that the access network apparatus supports a radio capability identifier. The access network apparatus receives support response information sent by the core network apparatus. The support response information is used to indicate whether the core network apparatus supports a radio capability identifier.

The access network apparatus determines, by using a mutual negotiation mechanism between the access network apparatus and the core network apparatus, whether a radio network identifier is supported between the access network apparatus and the core network apparatus.

According to a third aspect, a method for processing a change in a radio capability of a terminal apparatus is provided. The method includes:

An AMF receives first indication information sent by a terminal apparatus. The first indication information is used to indicate that a radio capability of the terminal apparatus changes.

The AMF sends radio capability change indication information to an access network apparatus. The radio capability change indication information is used to indicate that the radio capability of the terminal apparatus changes.

The AMF core network apparatus receives updated radio capability information, sent by the access network apparatus, of the terminal apparatus.

The core network apparatus determines a new radio capability identifier corresponding to the updated radio capability information of the terminal apparatus.

The core network apparatus sends the new radio capability identifier to the terminal apparatus.

In this embodiment of this application, after receiving the first indication information sent by the UE, the core network apparatus indicates, by using the radio capability change indication information, the access network apparatus to obtain a changed part of the radio capability of the UE, thereby improving efficiency and reducing air interface resources.

With reference to some implementations in the first aspect to the third aspect, the radio capability identifier includes at least one of a PLMN identifier and an RAT type. The PLMN identifier is used to indicate a PLMN supported by the terminal apparatus.

According to a fourth aspect, a terminal apparatus for processing a change in a radio capability of a terminal apparatus is provided. The terminal apparatus is configured to perform the steps of the terminal apparatus in the first aspect.

According to a fifth aspect, an access network apparatus for processing a change in a radio capability of a terminal apparatus is provided. The access network is configured to perform the steps of the access network apparatus in the second aspect. According to a sixth aspect, a core network apparatus for processing a change in a radio capability of a terminal apparatus is provided. The core network is configured to perform the steps of the access network apparatus in the fourth aspect.

According to a seventh aspect, an apparatus for processing a change in a radio capability of a terminal apparatus is provided. The apparatus includes a transceiver, a processor, and a memory. The processor is configured to control the transceiver to send and receive data. The memory is configured to store a computer program. The processor is configured to: invoke the computer program from the memory and run the computer program, so that the network device performs the method in any one of the first aspect to the third aspect and the possible implementations in the first aspect to the third aspect.

According to an eighth aspect, a computer-readable medium is provided. The computer-readable medium stores a computer program. When the computer program is executed by a computer, the method in any one of the first aspect to the third aspect and the possible implementations in the first aspect to the third aspect is implemented.

According to a ninth aspect, a computer program product is provided. When the computer program product is executed by a computer, the method in any one of the first aspect to the third aspect and the possible implementations in the first aspect to the third aspect is implemented.

According to a tenth aspect, a chip is provided. The chip may be configured to implement the method in any one of the first aspect to the third aspect and the possible implementations in the first aspect to the third aspect.

According to an eleventh aspect, a system is provided. The system includes the access network apparatus and the core network apparatus in the method in any one of the first aspect to the third aspect and the possible implementations in the first aspect to the third aspect.

According to a twelfth aspect, a system is provided. The system includes the access network apparatus, the core network apparatus, and the terminal apparatus in the method in any one of the first aspect to the third aspect and the possible implementations in the first aspect to the third aspect.

DESCRIPTION OF EMBODIMENTS

Figure 1:
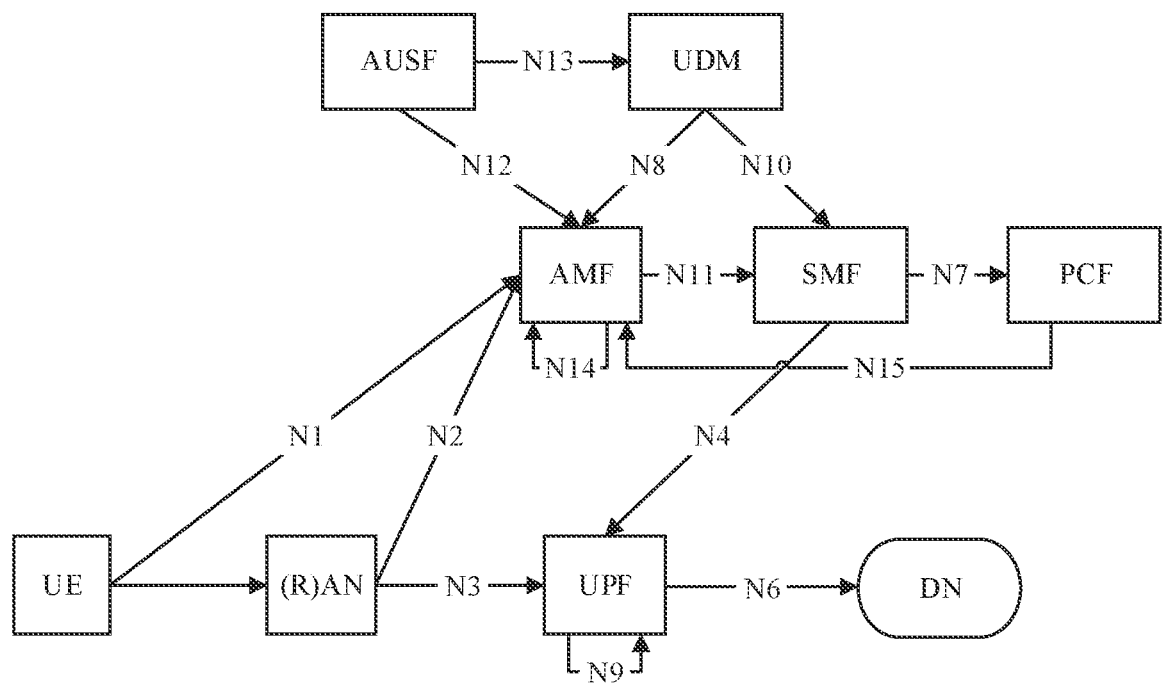
FIG. 1 is a schematic diagram of a possible network architecture used in an embodiment of this application.

The following describes the technical solutions of this application with reference to the accompanying drawings.

The technical solutions in embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LIE) system, an LIE frequency division duplex (FDD) system, an LIE time division duplex (TDD) system, a universal mobile telecommunications system (UMTS), a worldwide interoperability for microwave access (WiMAX) communications system, a future 5th generation (5G) system or a new radio (NR) system, and a possible future communications system.

A terminal apparatus in the embodiments of this application may be user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. Alternatively, the terminal apparatus may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal apparatus in a future 5G network, a terminal apparatus in a future evolved public land mobile network (PLMN), or the like. This is not limited in the embodiments of this application.

A core network (CN) device in the embodiments of this application may be a control anchor of the terminal apparatus, and provides functions such as registration area update for a terminal. For example, a core network apparatus may include an access and mobility management function (AMF) entity. The core network apparatus may be a network device configured to provide functions such as core network access and mobility management for the terminal. A specific function of the core network apparatus may be similar to a function of a mobility management entity (MME) in the LTE system.

An access network apparatus in the embodiments of this application may be a device configured to communicate with the terminal apparatus, and the access network apparatus may be a radio access network (RAN) device. The RAN device may include various types of base stations. For example, the base station in the embodiments of this application may include macro base stations, micro base stations, relay stations, and access points in various forms. In systems using different radio access technologies, names of devices that have base station functions may be different. For example, in an LTE network, a device that has a base station function is referred to as an evolved NodeB (eNB or eNodeB). In a 3rd generation (3G) network, a device that has a base station function is referred to as a NodeB. In a 5th generation (5G) network, a device that has a base station function is referred to as a gNodeB (gNB) or the like. This is not limited in the embodiments of this application.

In a possible manner, an access network device may include a centralized unit (CU) and a distributed unit (DU). One CU may be connected to one DU, or a plurality of DUs may share one CU, to reduce costs and facilitate network expansion. The CU and the DU may be divided based on a protocol stack. In a possible manner, a radio resource control (RRC) layer, a service data mapping protocol stack (SDAP) layer, and a packet data convergence protocol (PDCP) layer are deployed on the CU, and a remaining radio link control (RLC) layer, a remaining medium access control (MAC) layer, and a remaining physical layer are deployed on the DU.

In addition, in the embodiments of this application, the access network device provides a service for a cell, and the terminal apparatus communicates with a network device by using a transmission resource (for example, a frequency domain resource or a spectrum resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have small coverage and low transmit power, and are applicable to providing a high-rate data transmission service.

Context refers to establishment of a context session in a communications system, mainly refers to establishment of a connection between function entities, and is used for information transmission, or refers to information stored in an entity.

For example, context in LTE is mainly EPS bearer context, and is a process of establishing a connection link between UE and a P-GW. Signaling interaction may be performed after a signaling bearer is established, and a data packet may be sent/received after a data bearer is established.

A radio capability includes a radio access technology (RAT) supported by UE, for example, an energy level or a frequency band.

The technical solutions in the embodiments of this application may be specifically used in a 5G system in a non-roaming scenario. With reference to FIG. 1, the 5G system in the non-roaming scenario is described below.

FIG. 1 is a schematic diagram of an architecture of a 5G system in a non-roaming scenario.

The system architecture shown in FIG. 1 includes user equipment (UE), a radio access network (RAN), an access and mobility management network element (AMF), a session management network element (SMF), a user plane network element (UPF), a policy control network element (PCF), a unified data management network element (UDM), an authentication server function (AUSF) entity, and a data network (DN) module.

Main functions of devices in a core network in the system architecture shown in FIG. 1 are as follows:

The access and mobility management function (AMF) is mainly used for mobility management, access management, and the like, and may be used to implement functions other than session management in functions of a mobility management entity (MME), for example, functions such as lawful interception and access authorization/authentication.

The session management function (SMF) is mainly used for session management, internet protocol (IP) address allocation and management of a terminal apparatus, manageable user plane function selection, a termination point of a policy control and charging function interface, downlink data notification, and the like.

The user plane function (UPF) has a main function of routing and forwarding a data packet, and may be used as a mobility anchor or an uplink classifier to support in routing a service flow to a data network, or may be used as a branch point to support a multi-homed PDU session, and the like.

The policy control network element (PCF) has a main function of a policy decision point, and provides rules for service flow detection, application detection, gate control, QoS, and flow-based charging control.

The (radio) access network ((R)AN) is used to provide a network access function for an authorized user in a specific area, and can use transmission tunnels with different quality based on user levels, service requirements, and the like. A (R)AN network element can manage radio resources and provide an access service for a terminal apparatus, to further forward a control signal and user data between the terminal apparatus and a core network. The (R)AN network element may alternatively be understood as a base station in a conventional network.

The authentication server function (AUSF) is mainly used for user authentication and the like.

An application function (AF) is used for interaction with a 3GPP core network, to provide a service. The interaction includes interaction with an NEF, interaction with a policy architecture, and the like. Main functions of the network exposure function (NEF) include: securely opening, to inside, a third party, or the like, a service and a capability that are provided by a 3GPP network function; and converting or translating information exchanged with the AF and information exchanged with an internal network function, for example, an AF service identifier and internal 5G core network information such as a DNN and S-NSSAI.

The network exposure function (NEF) is used to securely open, to outside, a service and a capability that are provided by a 3GPP network function.

The unified data management (UDM) is used for user identifier processing, access authentication, registration, mobility management, and the like.

It should be noted that names of the network elements (such as the SMF, the AF, and the UPF) included in FIG. 1 are merely names, and the names do not constitute any limitation on the functions of the network elements. In a 5G network and another future network, the foregoing network elements may alternatively have other names. This is not specifically limited in the embodiments of this application. For example, in a 6G network, some or all of the foregoing network elements may still use terms in 5G, or may use other names, or the like. Descriptions are provided herein. Details are not described below.

It should be understood that the foregoing network architecture used in the embodiments of this application is merely an example of a network architecture for description, and a network architecture applicable to the embodiments of this application is not limited thereto. Any network architecture that can implement the functions of the foregoing network elements is applicable to the embodiments of this application.

Figure 2:
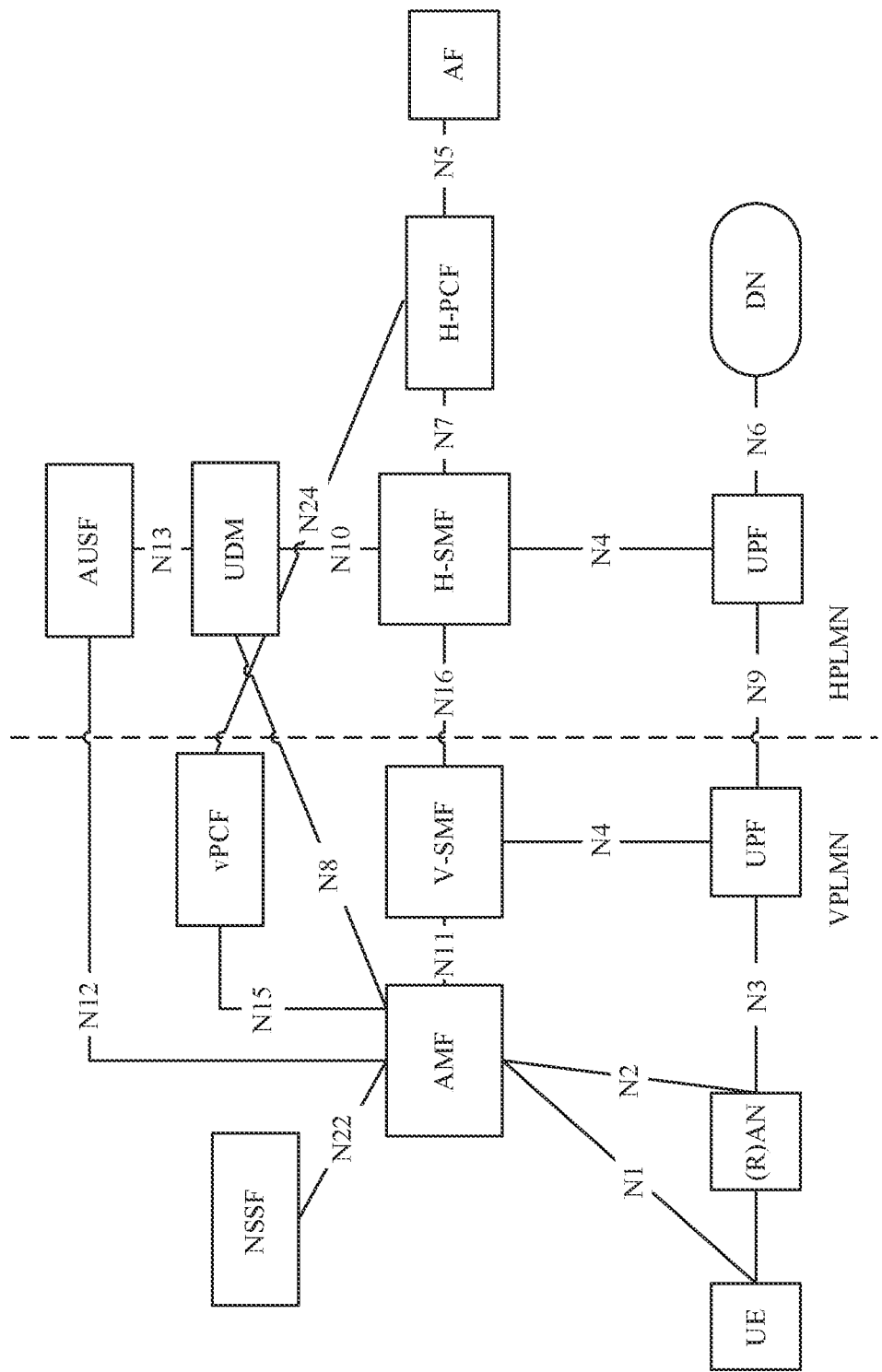
FIG. 2 is a schematic diagram of a possible network architecture used in an embodiment of this application.

It should be understood that, in addition to the 5G system in the non-roaming scenario shown in FIG. 1, the technical solutions in the embodiments of this application may be used in another system architecture. For example, the technical solutions in the embodiments of this application may also be used in a 5G system in a roaming scenario shown in FIG. 2.

The technical solutions in the embodiments of this application may be specifically used in a 4G system in a non-roaming scenario. The following describes the 4G system in the non-roaming scenario with reference to FIG. 3.

Figure 3:
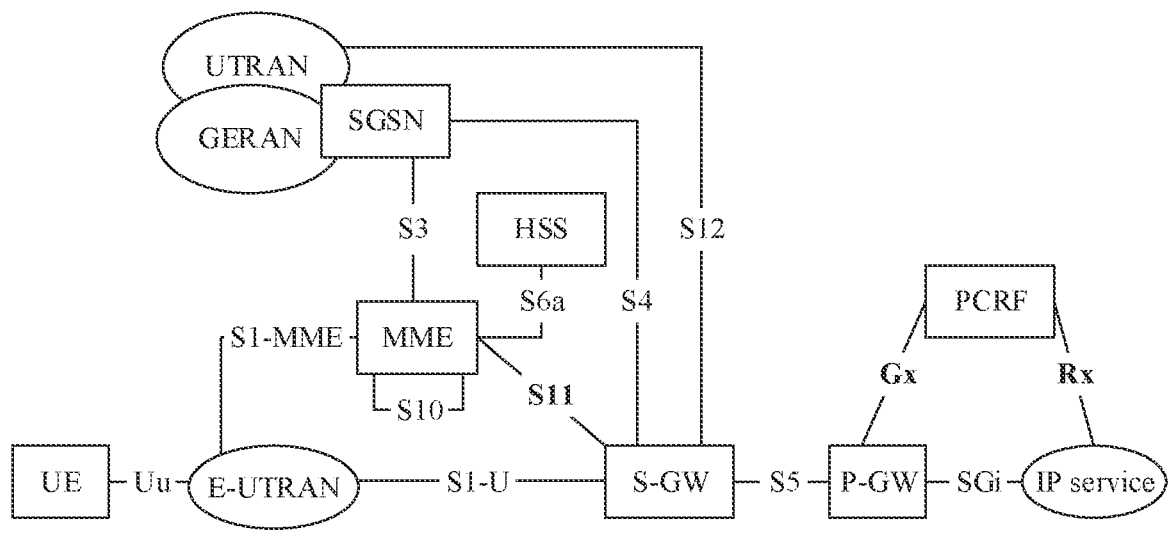
FIG. 3 is a schematic diagram of a possible network architecture used in an embodiment of this application.

FIG. 3 is a schematic diagram of an architecture of a 4G system in a non-roaming scenario.

The system architecture shown in FIG. 3 includes user equipment (UE), a mobility management entity (MME), a packet data network gateway (P-GW), a serving gateway (S-GW), and the like.

Main functions of devices in a core network in the system architecture shown in FIG. 3 are as follows:

An evolved universal terrestrial radio access network (EUTRAN) is a network including a plurality of eNodeBs, and implements a radio physical layer function, resource scheduling and radio resource management, radio access control, and a mobility management function. The eNodeB is connected to the S-GW through a user plane interface S1-U, and is configured to transmit user data; and is connected to the MME through a control plane interface S1-MME, and implements a function such as radio access bearer control by using an St-AP protocol.

The MME is mainly responsible for all control plane functions of user-level session management, including non-access stratum (NAS) signaling and security, tracking area management, P-GW and S-GW selection, and the like.

The S-GW is mainly responsible for data transmission, data forwarding, route switching, and the like of the user equipment, and serves as a local mobility anchor point when the user equipment is handed over between the eNode Bs (for each piece of user equipment, only one S-GW serves the user equipment at each moment).

The P-GW serves as an anchor point of a PDN connection, and is responsible for IP address allocation of the user equipment, and data packet filtering, rate control, charging information generation, and the like for the user equipment.

Figure 4:
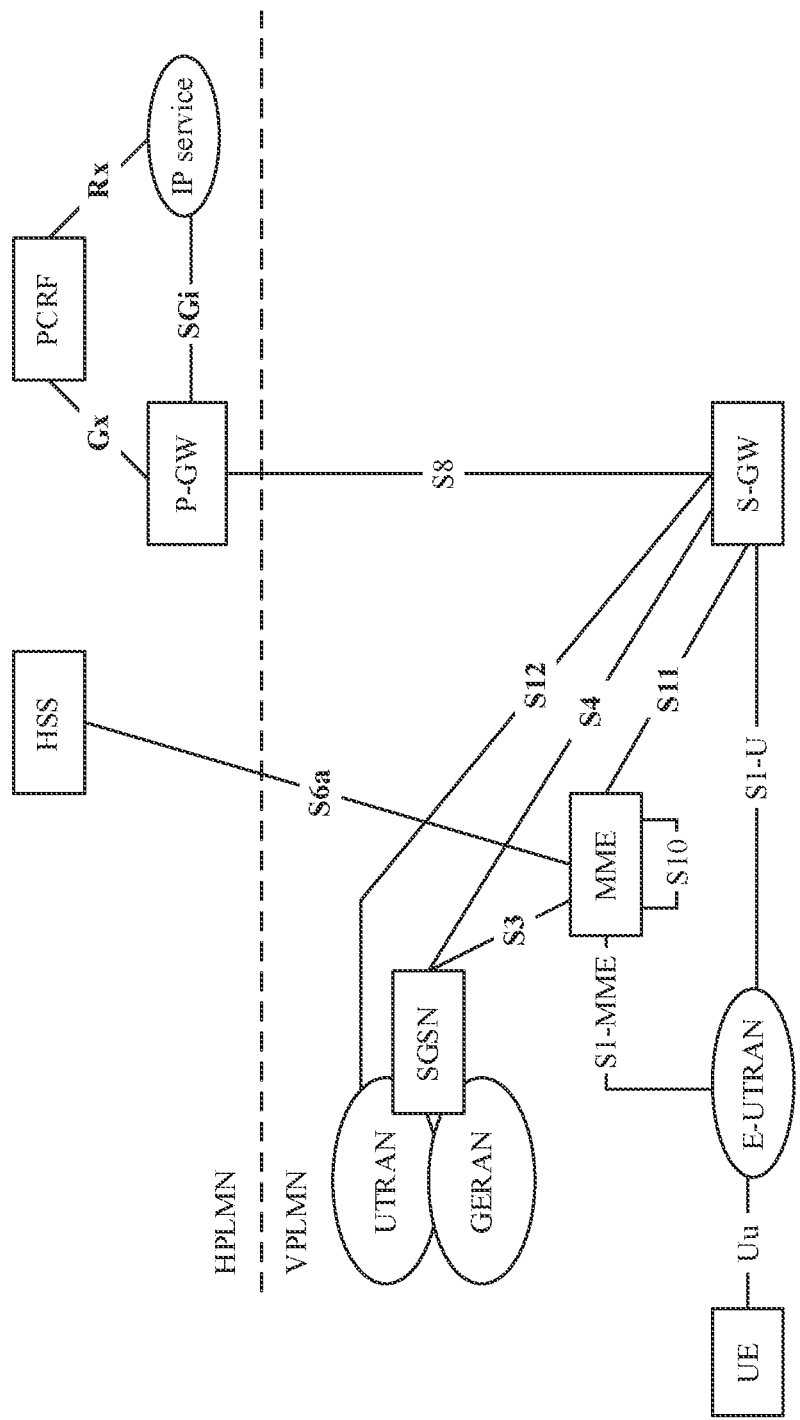
FIG. 4 is a schematic diagram of a possible network architecture used in an embodiment of this application.

It should be understood that, in addition to the 4G system in the non-roaming scenario shown in FIG. 3, the technical solutions in the embodiments of this application may be used in another system architecture. For example, the technical solutions in the embodiments of this application may also be used in a 4G system in a roaming scenario shown in FIG. 4.

Figure 5:
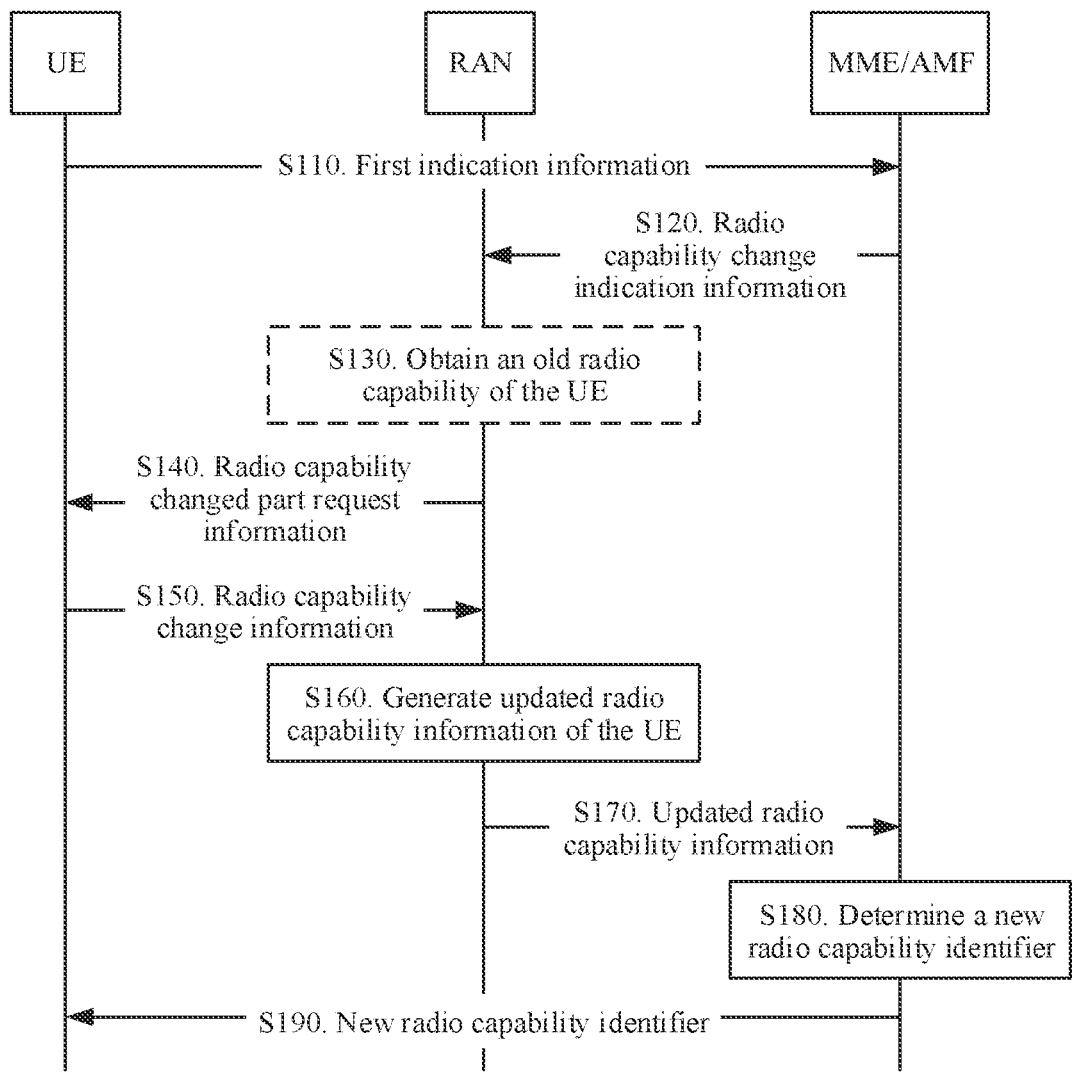
FIG. 5 is a schematic interaction diagram of a method for processing a change in a radio capability of a terminal apparatus according to an embodiment of this application.

FIG. 5 is a schematic diagram of a method for processing a change in a radio capability of a terminal apparatus according to an embodiment of this application. The method shown in FIG. 5 may be used at least in the systems in FIG. 1 to FIG. 4.

In this embodiment of this application, a core network apparatus may be specifically an AMF, a terminal apparatus may be UE, and an access network apparatus may be a RAN. When the core network apparatus is used in a 4G network, the core network apparatus may be an MME. S110. When radio capability information of the UE changes, the UE sends first indication information to the AMF, where the first indication information is used to indicate that a radio capability of the terminal apparatus changes, or indicate that the AMF needs to update a radio capability of the terminal apparatus. The first indication information may be included in a registration request message. The first indication information may be "UE radio capability update needed" (the radio capability of the UE needs to be updated). Optionally, the first indication information further includes first radio capability identifier information of the UE. The first radio capability identifier information is used to indicate a radio capability identifier corresponding to a changed part of the radio capability. It should be noted that when a system is the 4G system, the UE sends first indication information to the MME. The first indication information may be included in a tracking area update (TAU) request message.

Optionally, the radio capability information of the UE; may be used to indicate the radio capability of the UE. The radio capability information may include at least one of information such as a frequency band supported by the UE, a radio frequency parameter, and an uplink/downlink receiving capability. In another implementation, the first indication information is used by a RAN to obtain old radio capability information of the UE based on the first indication information, or used by the AMF to indicate, based on the first indication information, a RAN to obtain old radio capability information of the UE.

S120. After receiving the first indication information from the UE, the AMF sends radio capability change indication information to the RAN, where the radio capability change indication information is used to indicate that the radio capability of the terminal apparatus changes. The D3 radio capability change indication information may be in a form of a flag (identifier) that is described as "UE radio capability update needed (the radio capability of the UE needs to be updated)". The radio capability change indication information may be included in an S1-AP/N2 message.

Optionally, the AMF sends radio capability identifier information to the RAN. The radio capability identifier information indicates an identifier of the changed part of the radio capability. Both the radio capability identifier information and the radio capability change indication information may be included in the S1-AP/N2 message for sending.

In another implementation, after receiving the first indication information from the UE, the AMF may send an old radio capability of the UE to the RAN. Optionally, the AMF no longer sends the radio capability change indication information. In this case, the RAN does not need to perform step S130. The old radio capability is a to-be-changed radio capability of the terminal apparatus.

S130. After receiving the radio capability change indication information, the RAN obtains the old radio capability of the UE.

The RAN may obtain the old radio capability of the UE from the AMF or another UE radio capability information management entity, or may determine whether the old radio capability of the UE is locally stored in the RAN. Optionally, that the RAN queries the AMF or the another UE radio capability information management entity by using a UE radio capability identifier, to obtain the old radio capability of the UE may be specifically as follows: The RAN sends querying information that includes the radio capability identifier to the AMF or the another UE radio capability information management entity. After receiving the radio capability identifier, the AMF or the another UE radio capability information management entity sends a radio capability corresponding to the radio capability identifier to the RAN. The another UE radio capability information management entity is configured to store the radio capability of the UE. Optionally, the entity is further configured to: allocate a corresponding radio capability identifier to the radio capability, store a new radio capability identifier, and update a mapping relationship between the radio capability and a radio identifier.

Alternatively, the RAN queries, by using a UE radio capability identifier, whether radio capability information corresponding to the UE radio capability identifier is locally stored. If the RAN already stores the radio capability information, the RAN may obtain the old radio capability of the U E by locally querying the radio capability information.

S140. The RAN obtains a changed part of the radio capability of the terminal apparatus.

The RAN sends radio capability request information to the UE. The radio capability request information is used to request, from the terminal apparatus, the changed part of the radio capability of the terminal apparatus. Optionally, the radio capability request information may be radio capability changed part request information.

S150. The UE sends radio capability change information to the RAN, where the radio capability change information is the changed part of the radio capability of the terminal apparatus.

Optionally, a change in the radio capability of the UE includes disabling of a radio capability. For example, the UE needs to access the 4G network to perform an IoT service, but a 5G network does not support the IoT service. In this case, a 5G radio capability needs to be disabled, so that the UE keeps registering with the 4G network, to prevent the UE from reselecting the 5G network or being handed over to the 5G network. The changed part of the radio capability of the UE includes a disabled radio capability of the terminal apparatus. In this case, the changed part of the radio capability of the UE includes disabling indication information. The disabling indication information is used to indicate the disabled radio capability of the terminal apparatus. For example, the UE sends 4-bit sending radio capability change information, where 0001 indicates that 5G is disabled, and 0010 indicates that 4G is disabled.

Optionally, the UE may further indicate, in the radio capability change information, a radio capability corresponding to a radio access technology (RAT) changes. Based on a definition in 3GPP TS 29.212, a value of an RAT type (RAT type) includes: WLAN (0), VIRTUAL (1), UTRAN (1000), GERAN (1001), GAN (1002), HSPA_EVOLUTION (1003), FUTRAN (1004), EUTRAN-NB-IoT (1005), NG-RAN (1006), LTE-M (100×), CDMA2000_1×(2000), HRPD (2001), UMB (2002), and EHRPD (2003). The radio capability change information may include an RAT type information element. A value of the information element is a number that is in the foregoing brackets and that is of the RAT type.

S160. After receiving the radio capability change information, the RAN generates updated radio capability information of the UE based on the radio capability change information and the old radio capability information of the U E that is obtained in S120 or S130.

That the RAN generates the updated radio capability information includes:

(1) If the UE indicates that a radio capability is disabled, the RAN deletes the disabled radio capability from the old radio capability information, to obtain the updated radio capability information.
(2) If the UE indicates that a radio capability of an RAT changes, and reports a new radio capability corresponding to the RAI, the RAN replaces a radio capability information part corresponding to the RAT in the old radio capability information with a changed part reported by the UE, to obtain the updated radio capability information.
(3) If the change in the radio capability of the UE is not specific to an RAT, the RAN needs to determine, based on the radio capability change information reported by the UE, changed parts in the old radio capability information, and correspondingly replace the changed parts, to obtain the updated radio capability information. S170. The access network apparatus sends the updated radio capability information of the UE to the AMF. If the UE indicates, in S150, a radio access technology (RAT) type, optionally, the RAN sends RAT indication information, to indicate that a radio capability corresponding to the radio access technology (RAT) changes.

S180. After receiving the updated radio capability information, the AMF determines a new radio capability identifier corresponding to the updated radio capability information of the U E.

The AMF may store the updated radio capability information of the U E. In addition, in an implementation, the AMF stores the updated radio capability information of the UE by allocating a new radio capability identifier to a new radio capability corresponding to the updated radio capability information. In another implementation, the AMF stores the updated radio capability information of the UE by obtaining a new radio capability identifier from the another UE radio capability information management entity. The new radio capability identifier is allocated by another radio capability information management entity.

Table 1 shows an optional format of the UE radio capability identifier.

TABLE 1

| RAT type 1 | RAT type 1 radio capability ID | RAT type 2 | RAT type 2 radio capability ID | RAT type n | RAT type n radio capability ID |
|---|---|---|---|---|---|

Based on the foregoing definition, when radio capability information corresponding to an RAE type of the UE changes, the network needs to reallocate only a radio capability ID part corresponding to the RAT. For example, when a radio capability corresponding to an RAT type 1 of the UE changes, only an RAT type 1 radio capability ID needs to be updated. In actual application, the UE radio capability identifier may include only one RAT type. For example, UE capability ID 1=RAT type 1+RAT type 1 radio capability ID, and UE capability ID 2=RAT type 2+RAT type 2 radio capability ID. Alternatively, the UE radio capability identifier may include a plurality of RAT types. For example, UE capability ID 1=RAT type 1+RAT type 1 radio capability ID+RAT type 2+RAT type 2 radio capability ID, and UE capability ID 2=RAT type 2-RAT type 2 radio capability ID+RAT type 3+RAF type 3 radio capability ID.

In another implementation, PLMN information is added to the radio capability identifier. Different PLMNs have different identifiers, and the PLMN is a PLMN supported by the terminal apparatus.

S190. The AMF sends the new radio capability identifier to the UE.

In this embodiment, when the radio capability of the UE changes, only the changed part of the radio capability of the UE is transmitted between the UE and the RAN, and then the RAN generates the updated radio capability information of the U E based on the old radio capability information of the UE and the changed part. In this way, air interface transmission resources are reduced.

Figure 6:
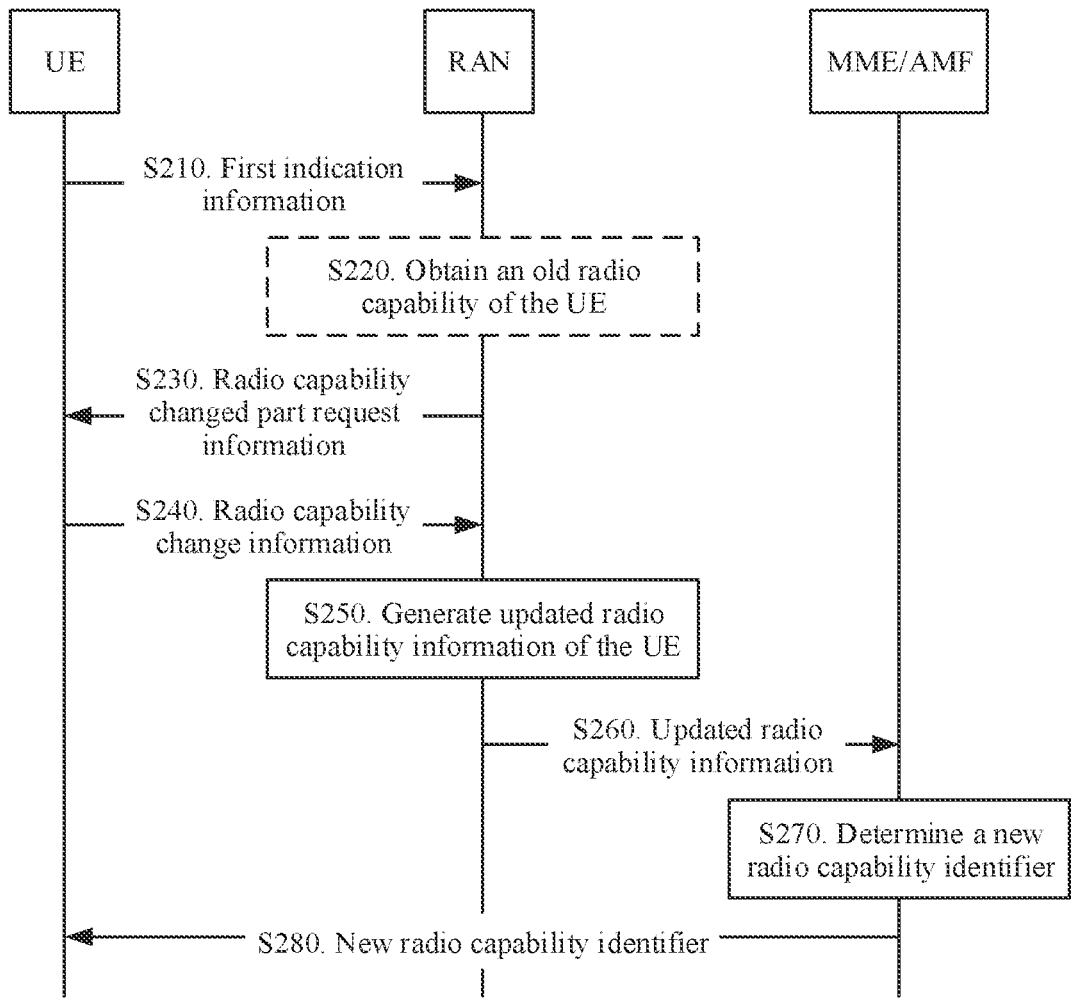
FIG. 6 is a schematic interaction diagram of a method for processing a change in a radio capability of a terminal apparatus according to another embodiment of this application.

FIG. 6 is a schematic diagram of a method for processing a change in a radio capability of a terminal apparatus according to another embodiment of this application. The method shown in FIG. 6 may be used at least in the systems in FIG. 1 to FIG. 4. For related steps and explanations in the embodiment shown in FIG. 6, refer to the same part in the embodiment shown in FIG. 5.

In the embodiment shown in FIG. 6, S210. When radio capability information of UE changes, the UE sends first indication information to an AMF, where the first indication information is used to indicate that a radio capability of the terminal apparatus changes, Different from S110 and S120 in the embodiment shown in FIG. 5, in the embodiment shown in FIG. 6, the UE sends the first indication information to the RAN, to notify the RAN that the radio capability of the UE changes. Optionally, the first indication information is included in a NAS message, and is sent by the UE to the RAN.

S220. After receiving the first indication information sent by the UE, the RAN obtains an old radio capability of the UE. For a process in which the RAN obtains the old radio capability of the UE, refer to the related descriptions in S130.

As described in S210 and S220, a difference between the embodiment shown in FIG. 6 and the embodiment shown in FIG. 5 lies in that manners for notifying the RAN that the radio capability of the terminal apparatus changes are different. For methods after S220 in the embodiment shown in FIG. 6, refer to the steps S140 to S190 in the embodiment shown in FIG. 5. Details are not described herein again.

In this embodiment, when the radio capability of the UE changes, only a changed part of the radio capability of the UE is transmitted between the UE and the RAN, and then the RAN generates updated radio capability information of the UE based on old radio capability information of the UE and the changed part. In this way, air interface transmission resources are reduced. In addition, because not all systems support a radio capability identifier, as an optional step, capability negotiation is performed between the RAN and the AMF, and between the UE and the RAN, to determine whether the RAN, the AMF, and the UE support a radio capability identifier. In this step, efficiency can be improved, and a waste of resources that is caused by an unnecessary subsequent process can be avoided.

Figure 7:
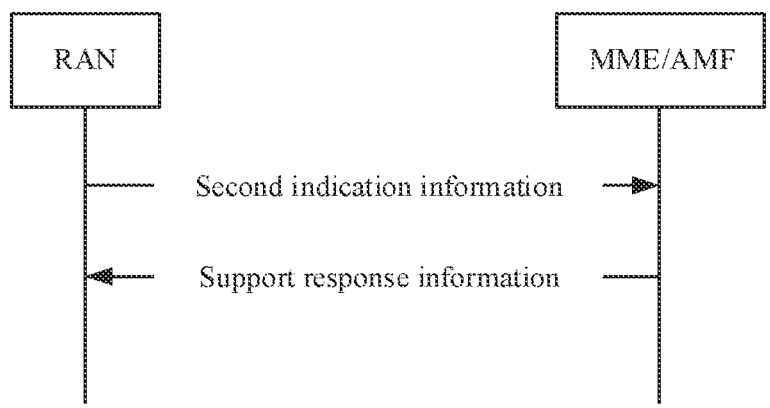
FIG. 7 is a schematic interaction diagram of a method for processing a change in a radio capability of a terminal apparatus according to another embodiment of this application.

FIG. 7 is a schematic diagram of a method for processing a change in a radio capability of a terminal apparatus according to another embodiment of this application. The method shown in FIG. 7 may be used at least in the systems in FIG. 1 to FIG. 4. As shown in FIG. 7, a RAN sends second indication information to a core network apparatus. The second information may be included in an S1 message or an N2 message for sending, and is used to indicate that the RAN supports a radio capability identifier. The core network apparatus sends support response information to the RAN. The support response information is used to indicate whether the core network apparatus supports a radio capability identifier. In another implementation, if the core network apparatus does not support a radio capability identifier, the core network apparatus may not reply.

Figure 8:
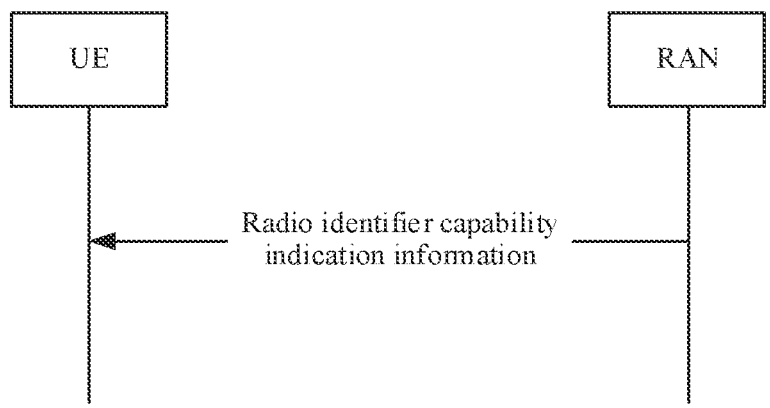
FIG. 8 is a schematic interaction diagram of a method for processing a change in a radio capability of a terminal apparatus according to another embodiment of this application.

FIG. 8 is a schematic diagram of a method for processing a change in a radio capability of a terminal apparatus according to another embodiment of this application. The method shown in FIG. 8 may be used at least in the systems in FIG. 1 to FIG. 4. As shown in FIG. 8, optionally, a RAN sends radio identifier capability indication information to a terminal apparatus. Optionally, the radio identifier capability indication information may be sent in a system message. The radio identifier capability indication information indicates that the RAN supports a UE radio capability identifier, or is used to indicate that both the RAN and a core network apparatus support a radio capability identifier. After determining that the RAN supports a radio capability identifier, or that both the RAN and the AMF support a radio capability identifier, the RAN sends the system message. Only after receiving the system message, the LIE includes a LIE radio capability identifier in a message to be subsequently sent.

The methods shown in FIG. 7 and FIG. 8 are performed before the methods in FIG. 5 and FIG. 6, or optionally, may be performed in the methods in FIG. 5 and FIG. 6, provided that the methods shown in FIG. 7 and FIG. 8 are performed before the LIE radio capability identifier needs to be used.

Figure 9:
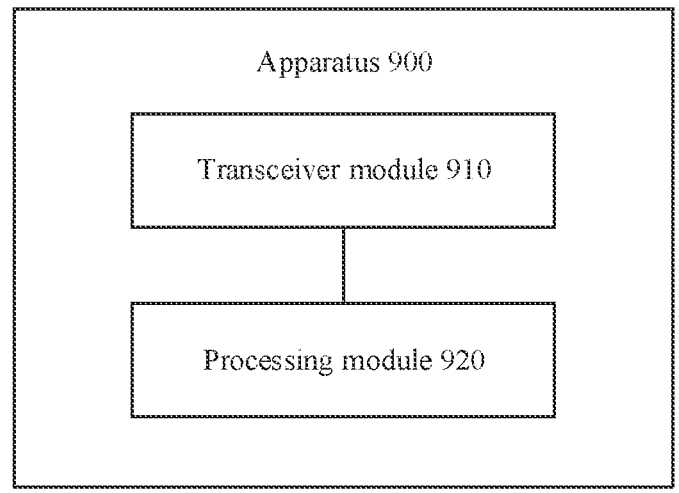
FIG. 9 is a schematic block diagram of an apparatus for processing a change in a radio capability of a terminal apparatus according to an embodiment of this application.

FIG. 9 is a schematic structural diagram of an apparatus for processing a change in a radio capability of a terminal apparatus according to an embodiment of this application. The apparatus 900 in FIG. 9 may correspondingly implement the steps or operations performed by the terminal apparatus in the foregoing descriptions, and may include the following modules.

In an embodiment, a transceiver module 910 is configured to send first indication information to a core network apparatus or an access network apparatus. The first indication information is used to indicate that a radio capability of a terminal apparatus changes. The transceiver module 910 is further configured to send radio capability change information to a RAN. The radio capability change information is a changed part of the radio capability of the terminal apparatus. When a change in a radio capability of UE includes disabling of a radio capability, the changed pail of the radio capability of the UE includes disabling indication information. The disabling indication information is used to indicate the disabled radio capability of the terminal apparatus.

In addition, the transceiver module 910 is further configured to receive a new radio capability identifier sent by the core network apparatus.

Optionally, the apparatus may further include a processing module 920 that is configured to determine that the radio capability of the UE changes.

In this embodiment of this application, when the radio capability of the UE changes, only the changed part of the radio capability of the UE is transmitted between the UE and the RAN, thereby reducing air interface transmission resources and improving communication efficiency.

It may be understood that, for implementations, interaction, and the like of the modules in the apparatus 900 in this embodiment of this application, refer to the related descriptions in the method embodiments.

Figure 10:
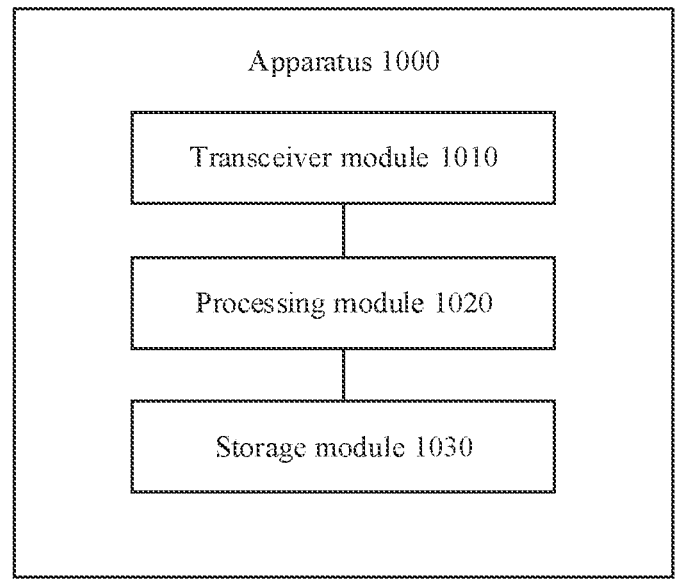
FIG. 10 is a schematic block diagram of an apparatus for processing a change in a radio capability of a terminal apparatus according to an embodiment of this application.

FIG. 10 is a schematic structural diagram of an apparatus for processing a change in a radio capability of a terminal apparatus according to an embodiment of this application. The apparatus 1000 in FIG. 10 may correspondingly implement the steps or operations performed by the core network apparatus in the foregoing descriptions, and may include the following modules.

In an embodiment, a transceiver module 1010 is configured to receive first indication information. The first indication information is used to indicate that a radio capability of a terminal apparatus changes. The transceiver module 1010 is further configured to send radio capability change indication information to an access network apparatus. The radio capability change indication information is used to indicate that the radio capability of the terminal apparatus changes.

The transceiver module 1010 is further configured to receive updated radio capability information, sent by the access network apparatus, of the terminal apparatus.

The transceiver module 1010 is further configured to send a new radio capability identifier to the terminal apparatus.

The core network apparatus further includes a processing module 1020 that is configured to determine the new radio capability identifier corresponding to the updated radio capability information of the terminal apparatus. Optionally, the processing module 1020 is configured to allocate the radio capability identifier. Optionally, the core network apparatus further includes a storage module 1030 that is configured to store radio capability information of the terminal apparatus.

It may be understood that, for implementations, interaction, and the like of the modules in the apparatus 1000 in this embodiment of this application, refer to the related descriptions in the method embodiments.

Figure 11:
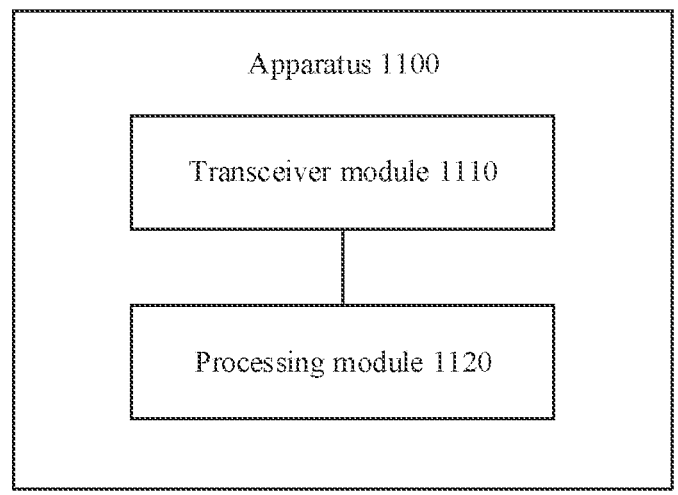
FIG. 11 is a schematic block diagram of an apparatus for processing a change in a radio capability of a terminal apparatus according to an embodiment of this application.

FIG. 11 is a schematic structural diagram of an apparatus for processing a change in a radio capability of a terminal apparatus according to an embodiment of this application. The apparatus 1100 in FIG. 11 may correspondingly implement the steps or operations performed by the access network apparatus in the foregoing descriptions, and may include the following modules.

A transceiver module 1120 is configured to receive radio capability change indication information. The radio capability change indication information is used to indicate that a radio capability of a terminal apparatus changes. The radio capability change indication information is first indication information, and the first indication information is included in an RRC message sent by the terminal. Alternatively, the radio capability change indication information is sent by a core network apparatus to the access network apparatus after the core network apparatus receives a TAU request message or a registration request message sent by the terminal apparatus. The TAU request message or the registration request message includes the first indication information. The first indication information is used to indicate that the radio capability of the terminal apparatus changes.

The transceiver module 1110 is further configured to send radio capability request information. The radio capability request information is used to request, from the terminal apparatus, a changed part of the radio capability of the terminal apparatus. Optionally, the radio capability request information may be radio capability changed part request information. The transceiver module 1110 is further configured to: send querying information that includes a radio capability identifier to an AMF or another UE radio capability information management entity, and receive a radio capability, corresponding to the radio capability identifier, sent by the AMF or the another UE radio capability information management entity.

The access network apparatus further includes a processing module 1120. The processing module 1120 is configured to generate updated radio capability information of UE based on old radio capability information of the UE and radio capability change information, namely, the chanced part of the radio capability of the terminal apparatus.

Optionally, the processing module 1120 is further configured to determine whether an old radio capability of the CE is locally stored.

The transceiver module 1110 is further configured to send the updated radio capability information of the UE to the AMF It may be understood that, for implementations, interaction, and the like of the modules in the apparatus 1100 in this embodiment of this application, refer to the related descriptions in the method embodiments.

Figure 12:
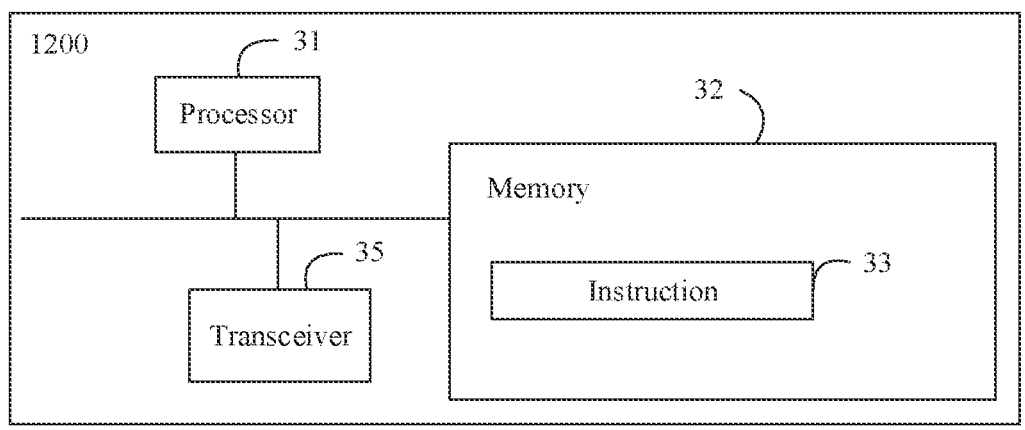
FIG. 12 is a schematic block diagram of an apparatus for processing a change in a radio capability of a terminal apparatus according to an embodiment of this application.

FIG. 12 is a schematic structural diagram of an apparatus for processing a change in a radio capability of a terminal apparatus. The apparatus 1200 may be configured to implement the method that corresponds to the access network apparatus and is described in the foregoing method embodiments, or may be configured to implement the method that corresponds to the terminal apparatus and is described in the foregoing method embodiments, or may be configured to implement the method that corresponds to the core network apparatus and is described in the foregoing method embodiments. For details, refer to the descriptions in the foregoing method embodiments.

The apparatus 1200 may include one or more processors 31. The processor 31 may also be referred to as a processing unit, and may implement a control function. The processor 31 may be a general-purpose processor, a dedicated processor, or the like.

In a possible design, a memory 32 may store an instruction 33. The instruction 33 may be run by the processor 31, so that the apparatus 1200 performs the method that corresponds to the access network apparatus or the terminal apparatus and that is described in the foregoing method embodiments.

In another possible design, the apparatus 1200 may include a circuit. The circuit may implement the sending, receiving, or communication function in the foregoing method embodiments.

Optionally, the apparatus 1200 may include one or more memories 32. The memory stores the instruction 33 or intermediate data. The instruction 33 may be run on the processor 31, so that the apparatus 1200 performs the method performed by the access network apparatus or the terminal apparatus in the foregoing method embodiments. Optionally, the memory may further store other related data. Optionally, the processor may also store an instruction and/or data. The processor and the memory may be separately disposed, or may be integrated together.

Optionally, the communications apparatus 1200 may further include a transceiver 35. The processor 31 may be referred to as a processing unit. The transceiver 35 may be referred to as a transceiver unit, a transceiver machine, a transceiver circuit, a transceiver, or the like, and is configured to implement a transceiver function of the apparatus.

In a design, an apparatus (for example, an integrated circuit, a wireless device, a circuit module, a network device, or a terminal) may include a processor and a transceiver. If the apparatus is configured to implement the steps or operations corresponding to the access network apparatus in the embodiments shown in FIG. 5 to FIG. 9, for example, the transceiver 35 may receive the first indication information or the radio capability change indication information.

The processor 31 is configured to generate the updated radio capability information of the UE based on the old radio capability information of the UE and the radio capability change information, namely, the changed part of the radio capability of the terminal apparatus.

Optionally, the transceiver 35 is further configured to: send the radio capability request information. The radio capability request information is used to request, from the terminal apparatus, the changed part of the radio capability of the terminal apparatus. Optionally, the radio capability request information may be the radio capability changed part request information. The transceiver 35 is further configured to send the querying information that includes the radio capability identifier to the AMF or the another UE radio capability information management entity, and receive the radio capability, corresponding to the radio capability identifier, sent by the AMF or the another UE radio capability information management entity.

Optionally, the processor 31 is further configured to determine whether the old radio capability of the UE is locally stored.

In a design, an apparatus (for example, an integrated circuit, a wireless device, a circuit module, a network device, or a terminal) may include a processor and a transceiver. If the apparatus is configured to implement the steps or operations corresponding to the terminal apparatus in FIG. 5, FIG. 6, and FIG. 8, for example, the transceiver 35 may send the first indication information to the core network apparatus or the access network apparatus, where the first indication information is used to indicate that the radio capability of the terminal apparatus changes. The transceiver 35 may send the radio capability change information. The radio capability change information is the changed part of the radio capability of the terminal apparatus. When the change in the radio capability of the UE includes disabling of a radio capability, the changed part of the radio capability of the UE includes the disabling indication information. The disabling indication information is used to indicate the disabled radio capability of the terminal apparatus. The transceiver 35 may receive the new radio capability identifier sent by the core network apparatus.

The processor 31 may determine that the radio capability of the UE changes.

In a design, an apparatus (for example, an integrated circuit, a wireless device, a circuit module, a network device, or a terminal) may include a processor and a transceiver. If the apparatus is configured to implement the steps or operations corresponding to the core network apparatus in FIG. 5 to FIG. 7, for example, the transceiver 35 may receive the first indication information, where the first indication information is used to indicate that the radio capability of the terminal apparatus changes. The transceiver 35 may further send the radio capability change indication information to the access network apparatus, where the radio capability change indication information is used to indicate that the radio capability of the terminal apparatus changes; receive the updated radio capability information, sent by the access network apparatus, of the terminal apparatus; and send the new radio capability identifier to the terminal apparatus.

Optionally, the processor 31 is configured to determine the new radio capability identifier, corresponding to the updated radio capability information, of the terminal apparatus. Optionally, the processor 31 is configured to allocate a radio capability identifier.

Optionally, the core network apparatus further includes the memory 32 that is configured to store the radio capability information of the terminal apparatus.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various IC technologies, for example, a complementary metal-oxide-semiconductor (CMOS), an n-type metal-oxide-semiconductor (NMOS), a p-type metal-oxide-semiconductor (PMOS), a bipolar junction transistor (BJT), a bipolar CMOS (BiCMOS), silicon germanium (SiGe), and gallium arsenide (GaAs).

In the foregoing embodiment descriptions, the apparatus 1200 is described by using an access network apparatus or a terminal apparatus as an example, but the apparatus described in this application is not limited to the access network apparatus or the terminal apparatus, and a structure of the apparatus may not be limited by FIG. 12. The apparatus may be an independent device or may be a part of a relatively large device. For example, the device may be:

(1) an independent integrated circuit IC, a chip, a chip system, or a subsystem;
(2) a set having one or more ICs, where optionally, the IC set may further include a storage component configured to store data and/or an instruction;
(3) an ASIC, for example, a modem (MSM);
(4) a module that can be embedded in another device;
(5) a receiver, a terminal, a cellular phone, a wireless device, a handheld phone, a mobile unit, or a network device; or
(6) another device.

In addition, the terms "system" and "network" may be used interchangeably in this specification. The term "and/or" in this specification is only an association relationship for describing associated objects and represents that there may be three relationships. For example, A and/or B may represent the following three cases: Only A exists, both A and B exist, and only B exists. In addition, the character "/" in this specification generally indicates an "or" relationship between associated objects.

It should be understood that in the embodiments of this application, "B corresponding to A" indicates that B is associated with A, and B may be determined based on A. However, it should further be understood that determining B based on A does not mean that B is determined based only on A. B may alternatively be determined based on A and/or other information.

Aspects or features in the embodiments of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry an instruction and/or data.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electric, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal apparatus, the terminal apparatus comprises:
at least one processor; and
one or more memories coupled to the at least one processor and storing programming instructions for executing by the at least one processor, wherein the programming instructions, when executed, cause the terminal apparatus to perform operations comprising:
receiving, radio identifier capability indication information sent by an access network apparatus, wherein the radio identifier capability indication information indicates that the access network apparatus supports a radio capability identifier;
sending, first indication information to the access network apparatus or a core network apparatus, wherein the first indication information indicates that a radio capability of the terminal apparatus changes, and the first indication information comprises first radio capability identifier information of the terminal apparatus, wherein the first radio capability identifier information indicates a radio capability identifier that identifies a changed part of the radio capability;
receiving, radio capability request information sent by the access network apparatus, wherein the radio capability request information requests, from the terminal apparatus, the changed part of the radio capability of the terminal apparatus; and
sending, radio capability change information to the access network apparatus, wherein the radio capability change information comprises the changed part of the radio capability of the terminal apparatus.

2. The terminal apparatus according to claim 1, wherein the operations further comprise: receiving, new radio capability identifier information sent by the core network apparatus, wherein the new radio capability identifier information indicates a new radio capability identifier of the terminal apparatus, wherein the new radio capability identifier corresponds to updated radio capability information of the terminal apparatus, and the updated radio capability information is determined by the access network apparatus based on at least the changed part of the radio capability.

3. The terminal apparatus according to claim 1, wherein the changed part of the radio capability of the terminal apparatus comprises disabling indication information, and the disabling indication information indicates a disabled radio capability of the terminal apparatus.

4. The terminal apparatus according to claim 1, wherein the operations comprise:
sending, the first indication information to the core network apparatus, wherein the first indication information is comprised in a tracking area update (TAU) request message or a registration request message.

5. The terminal apparatus according to claim 1, wherein the operations comprise:
sending, the first indication information to the access network apparatus, wherein the first indication information is comprised in a radio resource control (RRC) message.

6. An access network apparatus comprising:
at least one processor; and
one or more memories coupled to the at least one processor and storing programming instructions for executing by the at least one processor, wherein the programming instructions, when executed, cause the access network apparatus perform operations comprising:
sending, radio identifier capability indication information to a terminal apparatus, wherein the radio identifier capability indication information indicates that the access network apparatus supports a radio capability identifier;
receiving, radio capability change indication information, wherein the radio capability change indication information indicates that a radio capability of the terminal apparatus changes;
obtaining, from the terminal apparatus, a changed part of the radio capability of the terminal apparatus;
generating, updated radio capability information of the terminal apparatus based on at least an old radio capability of the terminal apparatus and the changed part of the radio capability of the terminal apparatus; and
sending, the updated radio capability information to a core network apparatus.

7. The access network apparatus according to claim 6, wherein the updated radio capability information is used by the core network apparatus to determine a new radio capability identifier of the terminal apparatus based on the updated radio capability information.

8. The access network apparatus according to claim 6, wherein the radio capability change indication information is first indication information, wherein the first indication information is comprised in an radio resource control (RRC) message sent by the terminal apparatus; or the radio capability change indication information is sent by the core network apparatus to the access network apparatus after the core network apparatus receives a tracking area update (TAU) request message or a registration request message sent by the terminal apparatus, wherein the TAU request message or the registration request message comprises the first indication information, and the first indication information indicates that the radio capability of the terminal apparatus changes.

9. The access network apparatus according to claim 6, wherein the access network apparatus further comprises:

obtaining, by the access network apparatus, the old radio capability of the terminal apparatus from the core network apparatus or a UE radio capability information management entity.

10. The access network apparatus according to claim 6, wherein the operations further comprise:
sending, radio access technology (RAT) indication information to the core network apparatus, wherein the RAT indication information indicates an RAT, wherein a radio capability corresponding to the RAT is updated.

11. The access network apparatus according to claim 6, wherein the operations further comprise:
sending, second indication information to the core network apparatus, wherein the second indication information indicates that the access network apparatus supports a radio capability identifier; and
receiving, by the access network apparatus, support response information sent by the core network apparatus, wherein the support response information indicates whether the core network apparatus supports a radio capability identifier.

12. A core network apparatus for processing a change in a radio capability of a terminal apparatus, the core network apparatus comprises:
at least one processor; and
one or more memories coupled to the at least one processor and storing programming instructions for executing by the at least one processor, wherein the programming instructions, when executed, cause the core network apparatus to perform operations comprising:
receiving second indication information sent by an access network apparatus, wherein the second indication information indicates that the access network apparatus supports a radio capability identifier;
sending support response information to the access network apparatus, wherein the support response information indicates whether the core network apparatus supports a radio capability identifier;
receiving, first indication information sent by the terminal apparatus, wherein the first indication information indicates that the radio capability of the terminal apparatus changes, and the first indication information comprises first radio capability identifier information of the terminal apparatus, wherein the first radio capability identifier information indicates a radio capability identifier that identifies a changed part of the radio capability;
sending, radio capability change indication information to the access network apparatus, wherein the radio capability change indication information indicates that the radio capability of the terminal apparatus changes;
receiving, sent by the access network apparatus, updated radio capability information of the terminal apparatus;
determining, a new radio capability identifier corresponding to the updated radio capability information of the terminal apparatus; and
sending, the new radio capability identifier to the terminal apparatus.

13. The core network apparatus according to claim 12, wherein a radio capability identifier comprises at least one of a PLMN identifier and an RAT type, and the PLMN identifier indicates a PLMN supported by the terminal apparatus.

14. The terminal apparatus according to claim 1, wherein the radio identifier capability indication information is sent in a system message.

15. The terminal apparatus according to claim 1, wherein the first indication information is sent in response to the radio identifier capability indication information indicating that the access network apparatus supports a radio capability identifier.

16. The access network apparatus according to claim 6, wherein the radio identifier capability indication information is sent in a system message.

17. The access network apparatus according to claim 11, wherein the radio identifier capability indication information is sent in response to the support response information indicating that the core network apparatus supports a radio capability identifier.

18. The core network apparatus according to according to claim 12, wherein the first indication information is comprised in a tracking area update (TAU) request message or a registration request message.

19. The access network apparatus according to claim 6, wherein the core network apparatus is an access and mobility management function (AMF) entity.

20. The core network apparatus according to claim 12, wherein the core network apparatus is an access and mobility management function (AMF) entity.

* * * * *

UNITED STATES PATENT AND TRADEMARK OFFICE
CERTIFICATE OF CORRECTION

| | | |
|---|---|---|
| PATENT NO. | : 12,133,288 B2 | Page 1 of 1 |
| APPLICATION NO. | : 17/225687 | |
| DATED | : October 29, 2024 | |
| INVENTOR(S) | : Zhenglei Huang | |

It is certified that error appears in the above-identified patent and that said Letters Patent is hereby corrected as shown below:

In the Specification

In Column 1, In Line 8, Delete "PCT/CN2019/1108972," and insert -- PCT/CN2019/108972, --.

In the Claims

In Column 22, In Line 35 (Approx.), In Claim 18, delete "according to according to" and insert -- according to --.

Signed and Sealed this
Eighteenth Day of February, 2025

Coke Morgan Stewart
*Acting Director of the United States Patent and Trademark Office*